(12) United States Patent
Horiuchi et al.

(10) Patent No.: US 10,871,809 B1
(45) Date of Patent: Dec. 22, 2020

(54) KEYBOARD

(71) Applicant: CHICONY ELECTRONICS CO., LTD., New Taipei (TW)

(72) Inventors: Mitsuo Horiuchi, New Taipei (TW); Chia-Hsin Chen, New Taipei (TW); Pai-Hsiang Wang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 16/792,491

(22) Filed: Feb. 17, 2020

Related U.S. Application Data (60) Provisional application No. 62/926,792, filed on Oct. 28, 2019.

(30) Foreign Application Priority Data

Dec. 25, 2019 (TW) .............................. 108147706 A (51) Int. Cl.
*G06F 1/16* (2006.01)
*G06F 1/20* (2006.01)
*H01H 13/83* (2006.01)

(52) U.S. Cl.
CPC ............ *G06F 1/203* (2013.01); *G06F 1/1662* (2013.01); *H01H 13/83* (2013.01)

(58) Field of Classification Search
None
See application file for complete search history.

(56) References Cited

U.S. PATENT DOCUMENTS

| | | | | |
|---|---|---|---|---|
| 5,251,096 A * | 10/1993 | Hosoi | ................. | E05B 65/5276 |
| | | | | 165/80.3 |
| 6,226,180 B1 * | 5/2001 | Ueda | ....................... | G06F 1/203 |
| | | | | 361/689 |
| 6,430,042 B1 * | 8/2002 | Ohashi | ..................... | G06F 1/203 |
| | | | | 165/104.33 |
| 8,587,945 B1 * | 11/2013 | Hartmann | ............... | G06F 1/203 |
| | | | | 361/708 |
| 9,047,066 B2 * | 6/2015 | Mongia | .................... | G06F 1/203 |
| 10,719,137 B1 * | 7/2020 | Kamepalli | ........... | H03K 17/955 |
| 2002/0154474 A1 * | 10/2002 | Merz | ..................... | G06F 1/1662 |
| | | | | 361/679.55 |

(Continued)

*Primary Examiner* — Xanthia C Cunningham
(74) *Attorney, Agent, or Firm* — Muncy, Geissler, Olds & Lowe, P.C.

(57) ABSTRACT

The present disclosure discloses a keyboard including a base plate, membrane circuit board, a plurality of keys and a frame. The base plate includes a plurality of assembly areas and a first opening. The first opening is disposed between some said assembly areas. The membrane circuit board is disposed above the base plate. The membrane circuit board includes a second opening corresponding in position to the first opening, respectively. The frame is disposed above the base plate, and the membrane circuit board is disposed between the base plate and the frame. The frame blocks the first and second openings. The frame includes receiving portions corresponding in position to the assembly areas. The keys pass through the receiving portions and are fixed to the assembly areas of the base plate, respectively. Gaps between the frame and keys, the first and second openings jointly form an air current channel.

14 Claims, 9 Drawing Sheets

(56) References Cited

U.S. PATENT DOCUMENTS

| | | | |
|---|---|---|---|
| 2009/0002941 A1* | 1/2009 | Mongia | H05K 5/0217 |
| | | | 361/690 |
| 2012/0170220 A1* | 7/2012 | Lin | G06F 3/0202 |
| | | | 361/695 |
| 2013/0113706 A1* | 5/2013 | Park | G06F 1/1662 |
| | | | 345/168 |
| 2016/0042891 A1* | 2/2016 | Ligtenberg | G06F 3/02 |
| | | | 341/33 |
| 2016/0274624 A1* | 9/2016 | North | H05K 7/20 |
| 2016/0327986 A1* | 11/2016 | Farahani | G06F 1/1662 |
| 2018/0070472 A1* | 3/2018 | Aiello | G06F 1/20 |
| 2018/0217668 A1* | 8/2018 | Ligtenberg | G06F 3/017 |
| 2018/0294113 A1* | 10/2018 | Mahajan | H01H 13/705 |
| 2019/0037725 A1* | 1/2019 | Uchino | G06F 1/16 |
| 2019/0043779 A1* | 2/2019 | Chung | C09K 5/14 |
| 2019/0091946 A1* | 3/2019 | Lancaster-Larocque | |
| | | | H01H 13/70 |
| 2019/0104645 A1* | 4/2019 | Paseman | G06F 1/206 |
| 2019/0115169 A1* | 4/2019 | Kano | G06F 1/1681 |
| 2019/0208662 A1* | 7/2019 | Lee | G06F 1/1624 |
| 2020/0090885 A1* | 3/2020 | Wang | G06F 3/041 |

* cited by examiner

KEYBOARD

CROSS REFERENCE TO RELATED APPLICATIONS

This application claims priority of Application No. 108147706 filed in Taiwan on Dec. 25, 2019 under 35 U.S.C. § 119; and this application claims priority of U.S. Provisional Application No. 62/926,792 filed on Oct. 28, 2019 under 35 U.S.C. § 119(e), the entire contents of all of which are hereby incorporated by reference.

BACKGROUND

1. Field of the Disclosure

The present disclosure relates to a keyboard.

2. Description of the Related Art

Nowadays keyboards are indispensable input devices for computer users. Computers and peripherals thereof are becoming lighter, thinner, shorter and smaller. Likewise, existing keyboards are thin keyboards which evolved from old-fashioned, bulky ones. The thin keyboards each essentially comprise a base plate, a membrane circuit board and a plurality of keys and often come with a backlight module in order to function as a light-emitting keyboard.

In general, there are gaps between the keys. The keyboard is topped with a frame for blocking dust and preventing light leakage. The frame has a plurality of openings for receiving the keys such that the gaps between the keys are blocked by the frame, so as to block dust and prevent light leakage.

Furthermore, a keyboard is usually required for a portable electronic device (for example, a notebook). There are openings on the bottom side or sidewalls of the casing of the portable electronic device. Via the openings, external air is drawn into the casing of the portable electronic device by a heat-dissipating structure (for example, a fan) disposed in the casing of the portable electronic device to achieve air circulation and heat dissipation. However, the openings on the bottom side or sidewalls of the casing fail to attain optimal heat dissipation.

SUMMARY

In view of the aforesaid drawback of the prior art, it is an objective of the present disclosure to provide a keyboard with a base plate and a membrane circuit board which a first and second openings are disposed on, to enhance heat dissipation.

In order to achieve the above and other objectives, the present disclosure provides a keyboard, comprising: a base plate, a membrane circuit board, a plurality of keys and a frame. The base plate comprises a plurality of assembly areas and at least one first opening. The at least one first opening is disposed between some said assembly areas. The membrane circuit board is disposed above the base plate. The membrane circuit board comprises at least one second opening corresponding in position to the at least one first opening, respectively. The frame is disposed above the base plate, and the membrane circuit board is disposed between the base plate and the frame. The frame blocks the first opening and the second opening. The frame comprises a plurality of receiving portions corresponding in position to the assembly areas, respectively. The keys pass though the receiving portions and are fixed to the assembly areas of the base plate, respectively. Gaps between the frame and the keys, the first opening and the second opening jointly form an air current channel.

According to an embodiment of the present disclosure, the first opening and the second opening jointly form a through hole.

According to an embodiment of the present disclosure, a width of the first opening is substantially greater than a width of one of the assembly areas.

According to an embodiment of the present disclosure, the first opening further comprises an extension portion extending outward along a short-axis direction of the base plate and being disposed between two adjacent said assembly areas.

According to an embodiment of the present disclosure, each said receiving portion has at least one recessed portion disposed on one of sidewalls of the receiving portion.

According to an embodiment of the present disclosure, the receiving portion has a plurality of recessed portions disposed on at least one said sidewall of the receiving portion and spaced apart.

According to an embodiment of the present disclosure, the recessed portions are disposed on two opposing said sidewalls of the receiving portion, spaced apart, and arranged in staggered.

According to an embodiment of the present disclosure, the keyboard further comprises a backlight module disposed on a side of the base plate and opposing the keys. The backlight module comprises a light guide plate and at least one light-emitting unit. The light guide plate comprises a third opening, and the third opening corresponds in position to the first opening and the second opening. The light-emitting unit emits light toward an interior of the light guide plate.

According to an embodiment of the present disclosure, the light-emitting unit has a light emission direction parallel to a long-axis direction of the third opening.

According to an embodiment of the present disclosure, the backlight module has a reflective structure disposed on an inner wall of the third opening of the light guide plate.

According to an embodiment of the present disclosure, a rim of the first opening or the second opening is smaller than a rim of the third opening.

According to an embodiment of the present disclosure, a rim of the second opening is smaller than a rim of the first opening, and a rim of the first opening is smaller than a rim of the third opening.

According to an embodiment of the present disclosure, a rim of the second opening is smaller than a rim of the first opening.

According to an embodiment of the present disclosure, a long-axis direction of the first opening is parallel to a long-axis direction of the base plate.

Regarding the keyboard of the present disclosure, the base plate has assembly areas and at least one first opening, and the first opening is disposed between some said assembly areas. The membrane circuit board has at least one second opening corresponding in position to the first opening. Owing to the first opening and the second opening, external cold air flows through an applicable device (for example, a portable electronic device) via the gaps between the frame and the keys, the first opening and the second opening to achieve heat dissipation.

DETAILED DESCRIPTION OF THE EMBODIMENTS

Features and advantages of the present disclosure are hereunder illustrated with specific embodiments, depicted with drawings, and described below.

Figure 1:
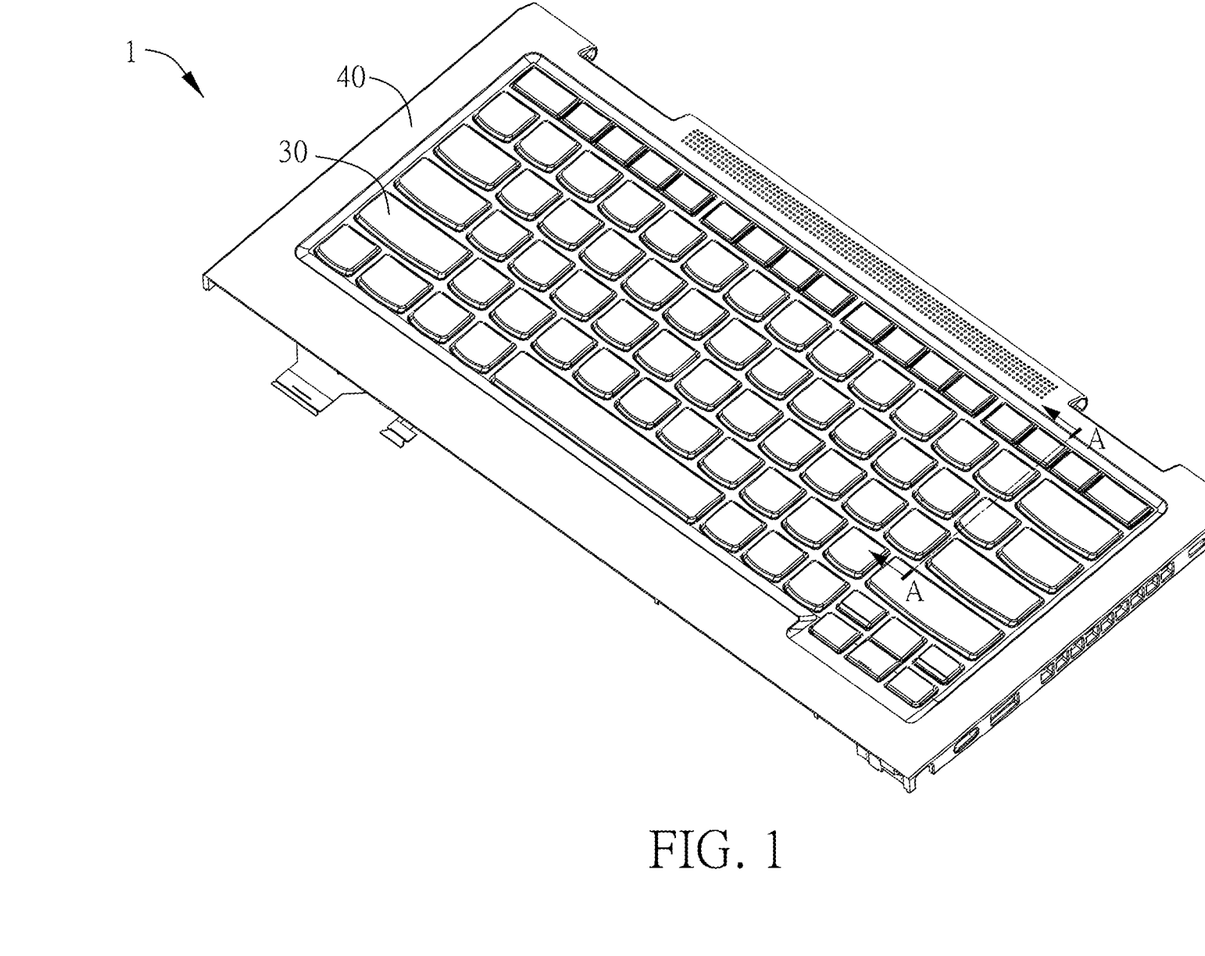
FIG. 1 is a schematic view of a keyboard according to an embodiment of the present disclosure.
Figure 2:
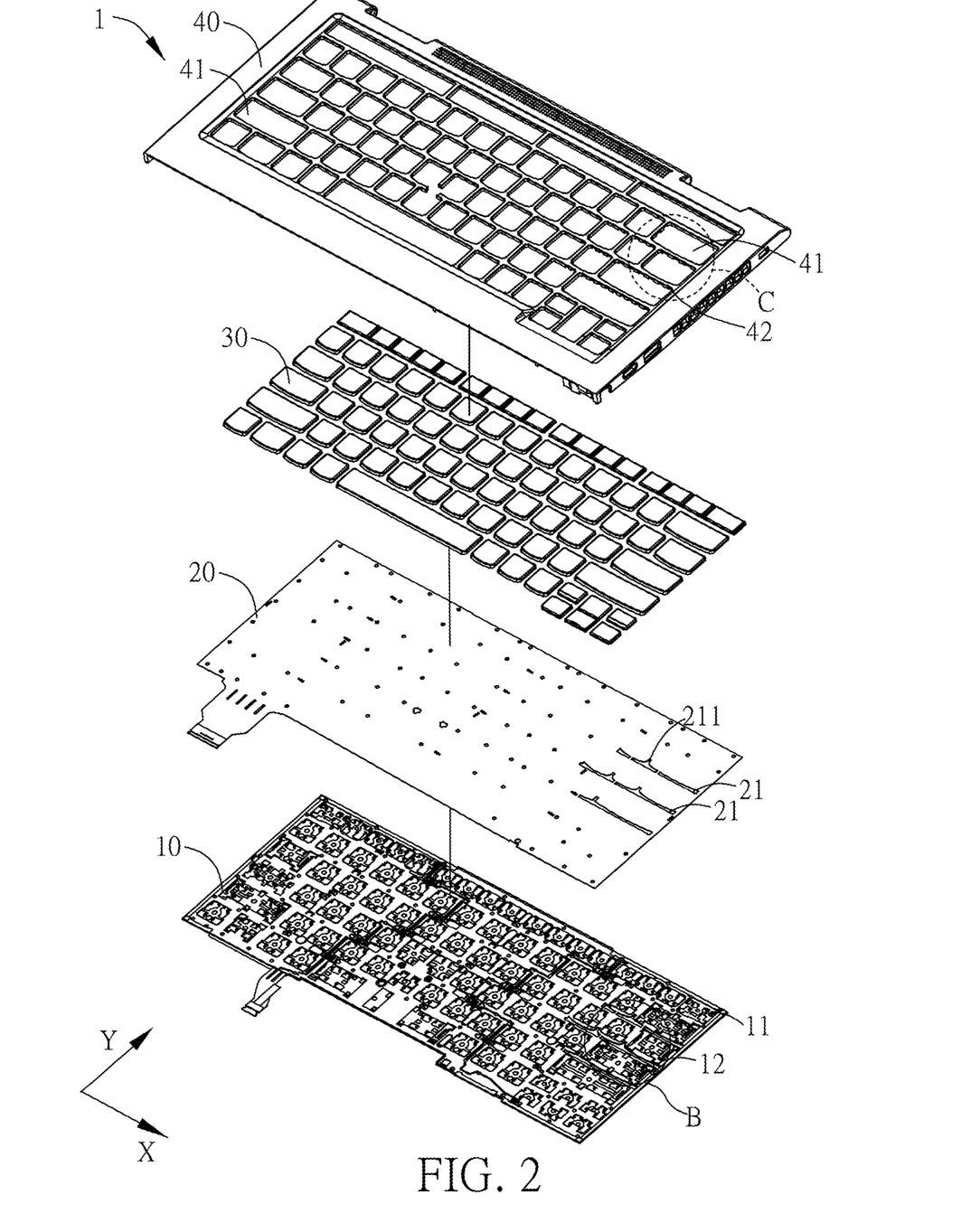
FIG. 2 is an exploded view of the keyboard shown in FIG. 1.
Figure 3:
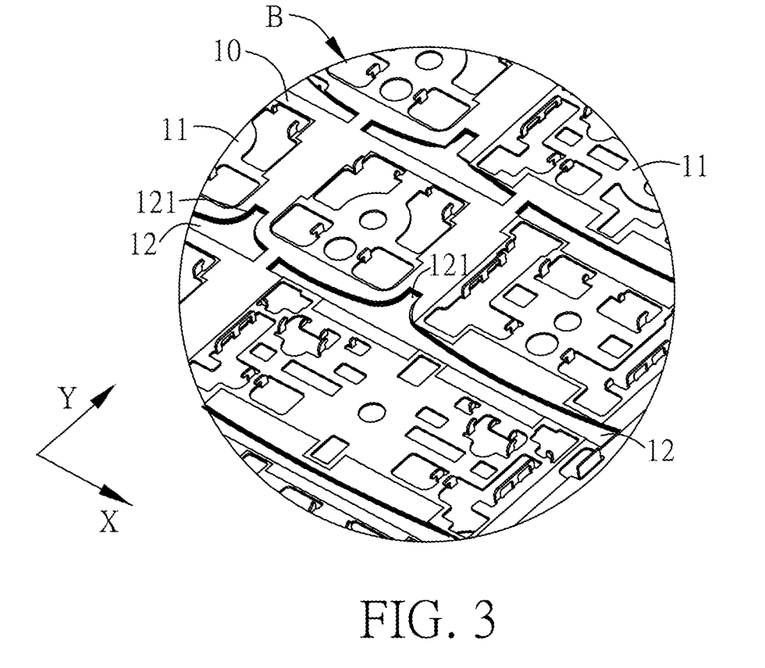
FIG. 3 is an enlarged view of the area B of a base plate shown in FIG. 2.
Figure 4:
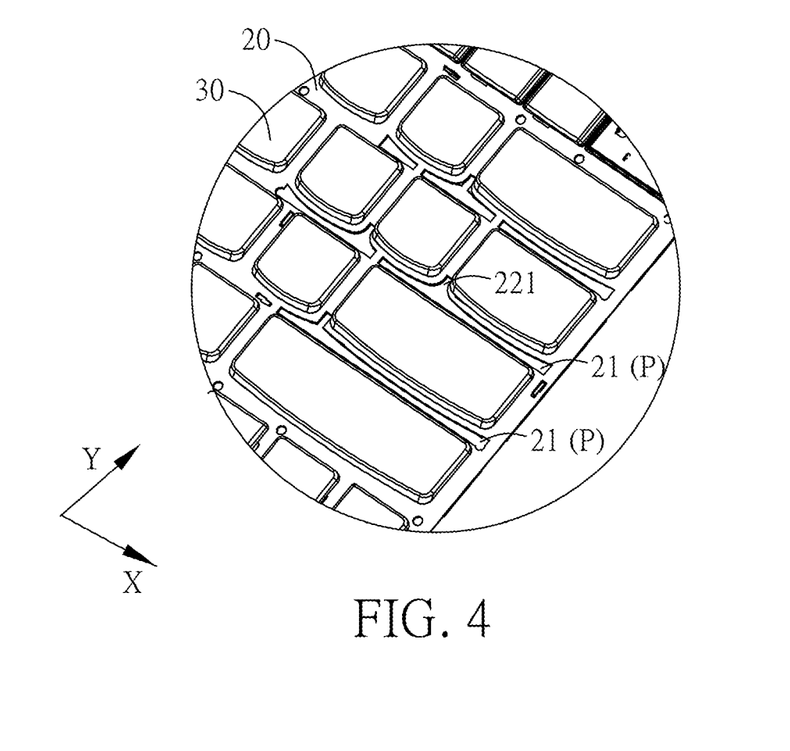
FIG. 4 is an enlarged view of part of a combination of a membrane circuit board, keys and the base plate shown in FIG. 2.
Figure 5:
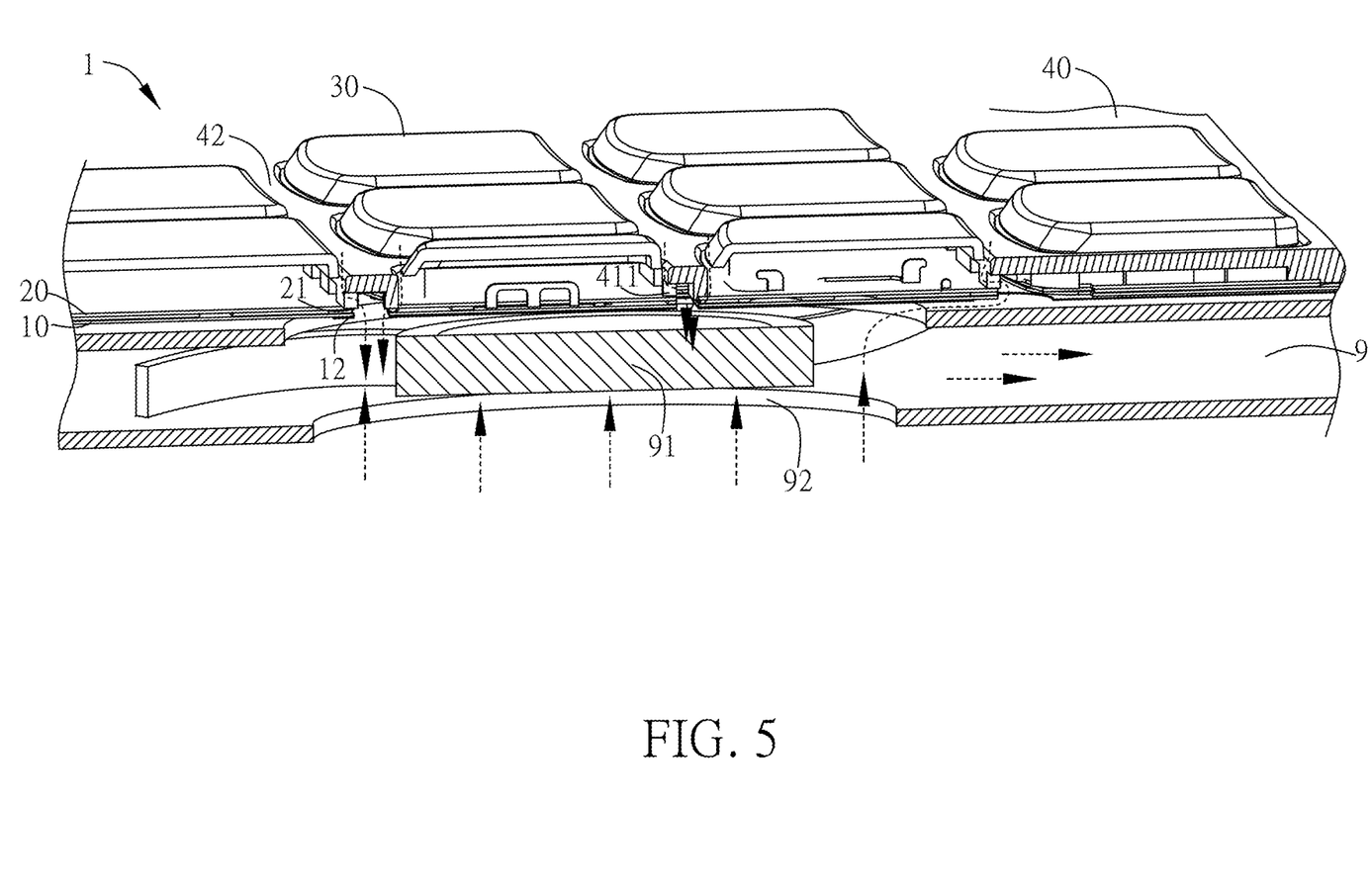
FIG. 5 is a cross-sectional view of part of the keyboard shown in FIG. 1 and applied to a portable electronic device.

FIG. 1 is a schematic view of a keyboard according to an embodiment of the present disclosure. FIG. 2 is an exploded view of the keyboard shown in FIG. 1. FIG. 3 is an enlarged view of the area B of a base plate shown in FIG. 2. FIG. 4 is an enlarged view of part of a combination of a membrane circuit board, keys and the base plate shown in FIG. 2. FIG. 5 is a cross-sectional view of part of the keyboard shown in FIG. 1 and applied to a portable electronic device. Referring to FIG. 1 through FIG. 5, in this embodiment, a keyboard 1 comprises a base plate 10, a membrane circuit board 20, a plurality of keys 30 and a frame 40. The base plate 10 comprises a plurality of assembly areas 11 and at least one first opening 12, as shown in FIG. 3. FIG. 3 is an enlarged view of the area B shown in FIG. 2. The keys 30 are mounted in the assembly areas 11. Each assembly area 11 has a plurality of hook members. The keys 30 each comprise a keycap, a position-restoring element and a connecting element. The connecting element connects the keycap to a corresponding one of the hook members of the base plate 10 and guides the keycap moving vertically relative to the base plate 10. The connecting elements are, for example, scissor connecting elements for mounting the keys 30 in the assembly areas 11 of the base plate 10, respectively. The position-restoring elements restore the keycaps to their initial positions, respectively. The position-restoring elements are, for example, rubber dome, metallic leaf springs, and magnetic components. To be simple, the diagrams do not show the connecting elements and the position-restoring elements but show the keycaps.

The first opening 12 is disposed between some said assembly areas 11. There are gaps between the assembly areas 11, and the first opening 12 is disposed at the gaps between the assembly areas 11. Therefore, when the keys 30 are mounted on the base plate 10, the first opening 12 is disposed between some said keys 30. Preferably, the first opening 12 is substantially an oblong opening for enhancing the efficiency of air circulation. In a variant embodiment, the first opening 12 is substantially an oblong opening formed by aligned square openings, round openings or oval openings. Preferably, the width of the first opening 12 is greater than the width of one of the assembly areas 11. Therefore, the length of the long-axis of the first opening 12 is preferably greater than the length of a long-axis direction X of one of the adjacent assembly areas 11 on the base plate 10. The assembly areas 11 each have a hollowed-out structure; however, when the keys 30 are mounted on the base plate 10, the keys 30 block the hollowed-out structures of the assembly areas 11, and thus circulation of external air from the assembly areas 11 is unlikely. In view of this, the presence of the first opening 12 between some of the assembly areas 11 allows easy circulation of external air via the first opening 12. Preferably, the long-axis direction of the first opening 12 is parallel to the long-axis direction X of the base plate 10.

Preferably, the first opening 12 further comprises an extension portion 121 extending outward along the short-axis direction of the first opening 12 (and also extending along or being parallel to a short-axis direction Y of the base plate 10) and being disposed between two adjacent assembly areas 11. Therefore, the extension portion 121 extends along the short-axis direction Y away from the first opening 12 outwardly in such a manner to allow the extension portion 121 to be disposed between the two adjacent assembly areas 11. The extension portion 121 is conducive to enlargement of the first opening 12 and an increase in its cross-section for air circulation.

Referring to FIG. 2 and FIG. 4, the membrane circuit board 20 is disposed above the base plate 10 and disposed on the surface thereof proximate to the keys 30. The membrane circuit board 20 comprises at least one second opening 21 corresponding in position to the at least one first opening 12, respectively. The second opening 21 is substantially the same as the at least one first opening 12 in shape and position. For instance, the second opening 21 is also an oblong opening. Each second opening 21 further comprises an extension portion 211 extending outward along the short-axis direction Y of the second opening 21 and corresponding in position to the extension portion 121. When the membrane circuit board 20 is disposed on the base plate 10, each first opening 12 and the corresponding second opening 21 jointly form a through hole P. Air circulates inside and outside the keyboard 1 via the through hole P (the first opening 12 and the second opening 21).

Referring to FIG. 2 and FIG. 5. FIG. 5 is a cross-sectional view, taken along line A-A of FIG. 1, of the keyboard 1 shown in FIG. 1 and applied to a portable electronic device 9 (such as a notebook). In this embodiment, the frame 40 is disposed above the base plate 10, and the membrane circuit board 20 is disposed between the base plate 10 and the frame 40. The frame 40 comprises a plurality of receiving portions 41 corresponding in position to the assembly areas 11, respectively. The receiving portions 41 area hollowed-out structures for accommodating the keys 30; and the receiving portions 41 correspond in position to the assembly areas 11, such that the keycaps of the keys 30 can pass through the receiving portions 41, respectively, in order to be accessible to users. With the receiving portions 41 being hollowed-out structures, the frame 40 further has a plurality of ribs 42 for connecting the receiving portions 41. Therefore, the ribs 42 separate the hollowed-out receiving portions 41. When the frame 40 is disposed above the base plate 10, the ribs 42 of the frame 40 block the through hole P jointly formed by each first opening 12 and the corresponding second opening 21, so as to achieve visual beauty.

In this embodiment, to apply the keyboard 1 to the portable electronic device 9, both the first opening 12 and the second opening 21 are designed to be near a heat source (for example, a processing module) of the portable electronic device 9 or a cooling fan 91. In this embodiment, the first opening 12 and the second opening 21 are near the cooling fan 91 of the portable electronic device 9, and the bottom side of the portable electronic device 9 has an opening 92 for air circulation.

Figure 6:
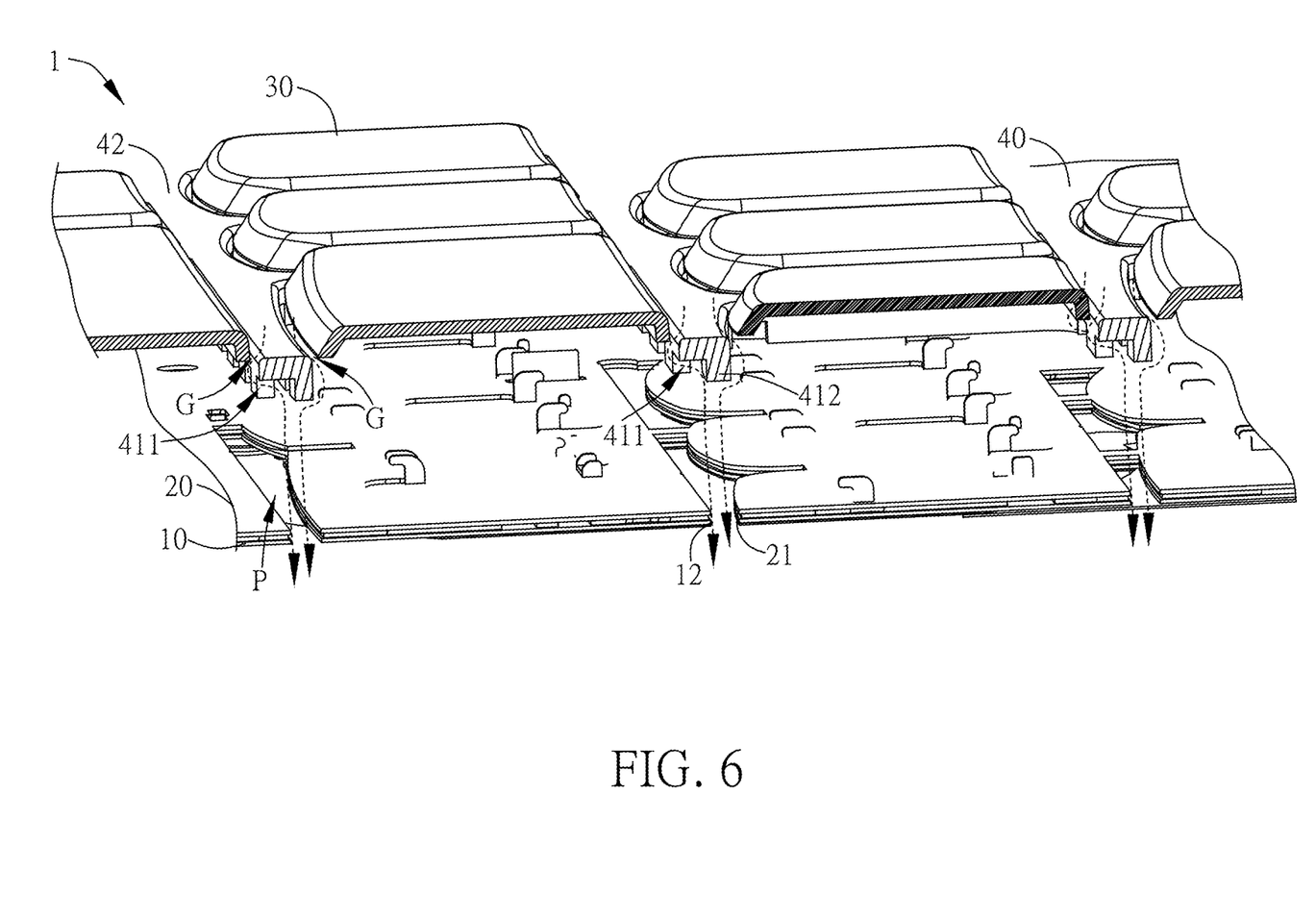
FIG. 6 is an enlarged view of part of the keyboard shown in FIG. 5.

FIG. 6 is an enlarged view of part of the keyboard shown in FIG. 5. Referring to FIG. 5 and FIG. 6, when the cooling fan 91 in the portable electronic device 9 is operating, gaps G between the frame 40 and the keys 30, the first opening 12 and the second opening 21 jointly form an air current channel (indicated by arrows). External (cold) air enters the portable electronic device 9 via the air current channel and then exits heat-dissipating holes on the sidewalls, so as to achieve heat dissipation. Furthermore, external air enters the portable electronic device 9 also via the opening 92 on the bottom side. In short, external cold air enters the portable electronic device 9 via the opening 92 on the bottom side of the portable electronic device 9 and via the air current channel on the top side of the portable electronic device 9 before being discharged from the portable electronic device 9 via the heat-dissipating holes on the sidewalls of the portable electronic device 9 to achieve heat dissipation.

Figure 7A:
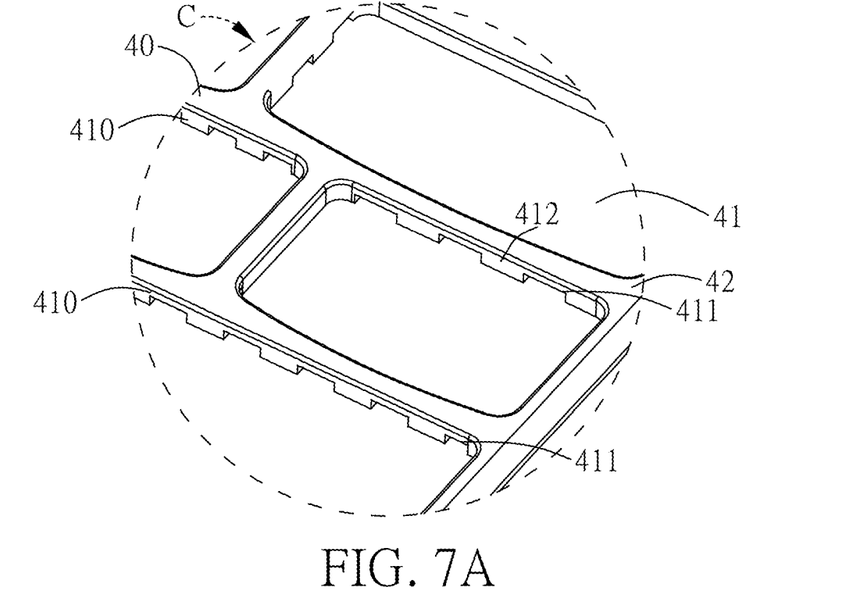
FIG. 7A is an enlarged view of part of the frame shown in FIG. 2 and the area C shown in FIG. 2.
Figure 7B:
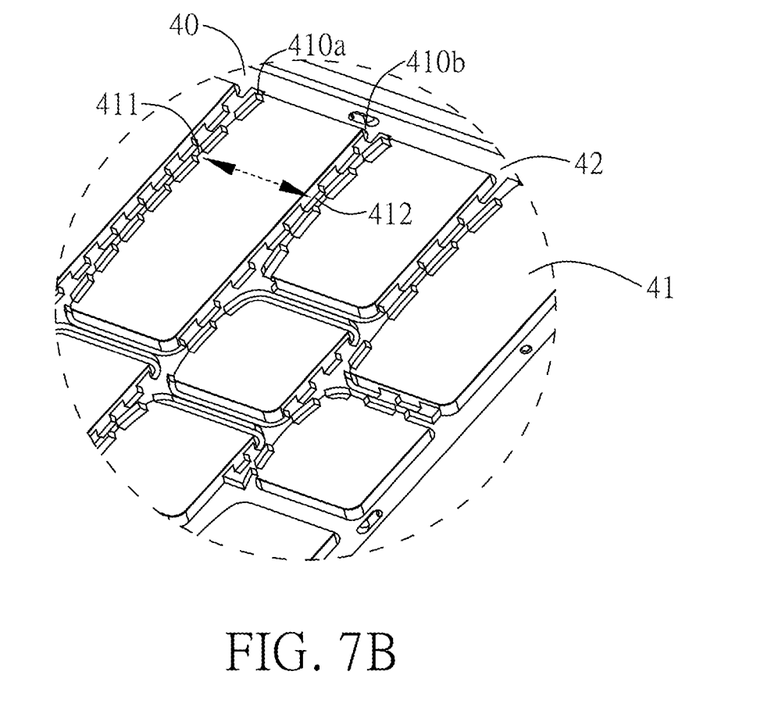
FIG. 7B is a schematic view of the bottom side of the frame shown in FIG. 7A.

FIG. 7A is an enlarged view of part of the frame shown in FIG. 2 and the area C shown in FIG. 2. FIG. 7B is a schematic view of the bottom side of the frame shown in FIG. 7A. Referring to FIG. 5, FIG. 6, FIG. 7A and FIG. 7B, preferably, in this embodiment, each receiving portion 41 has at least one recessed portion 411 corresponding in position to the first opening 12 and the second opening 21 and disposed on one of sidewalls 410 of the receiving portion 41. Preferably, the receiving portion 41 has a plurality of recessed portions 411. The recessed portions 411 are disposed on the sidewall 410 of the receiving portion 41 and spaced apart. The recessed portions 411 are formed by directly hollowing out the sidewall 410 of the receiving portion 41. Therefore, during a process of manufacturing the frame 40, the sidewall 410 is directly hollowed out at intervals to form the recessed portions 411. In this embodiment, the recessed portions 411 are disposed on the two opposing sidewalls 410 of the receiving portion 41, spaced apart, and arranged in staggered. Specifically speaking, the receiving portion 41 has a plurality of raised portions 412 which are intact parts of the sidewalls 410. Therefore, each raised portion 412 is disposed between two adjacent recessed portions 411. Arranging the recessed portions 411 on the two opposing sidewalls 410 in staggered causes the recessed portions 411 on a sidewall 410a to correspond in position to the raised portions 412 on another sidewall 410b, as indicted by a double-headed arrow in FIG. 7B.

Referring to FIG. 5 and FIG. 6, the recessed portions 411 are conducive to an increase in the space available for air circulation. Therefore, the gaps G between the frame 40 and the keys 30, the recessed portions 411, the first opening 12 and the second opening 21 jointly form an air current channel. When the cooling fan 91 is operating, external cold air enters the portable electronic device 9 via the air current channel to achieve heat dissipation.

Figure 8:
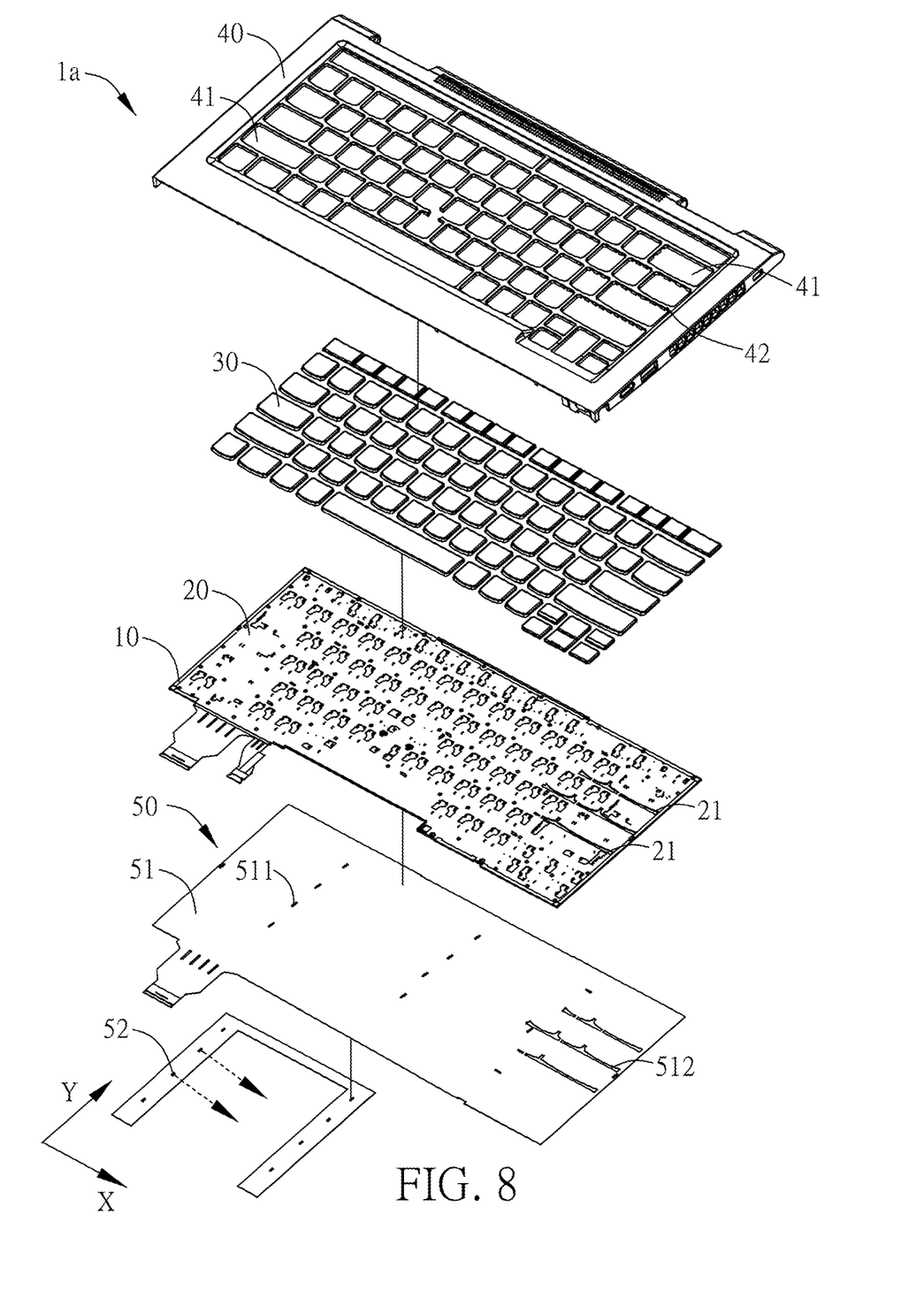
FIG. 8 is an exploded view of the keyboard according to another embodiment of the present disclosure.
Figure 9:
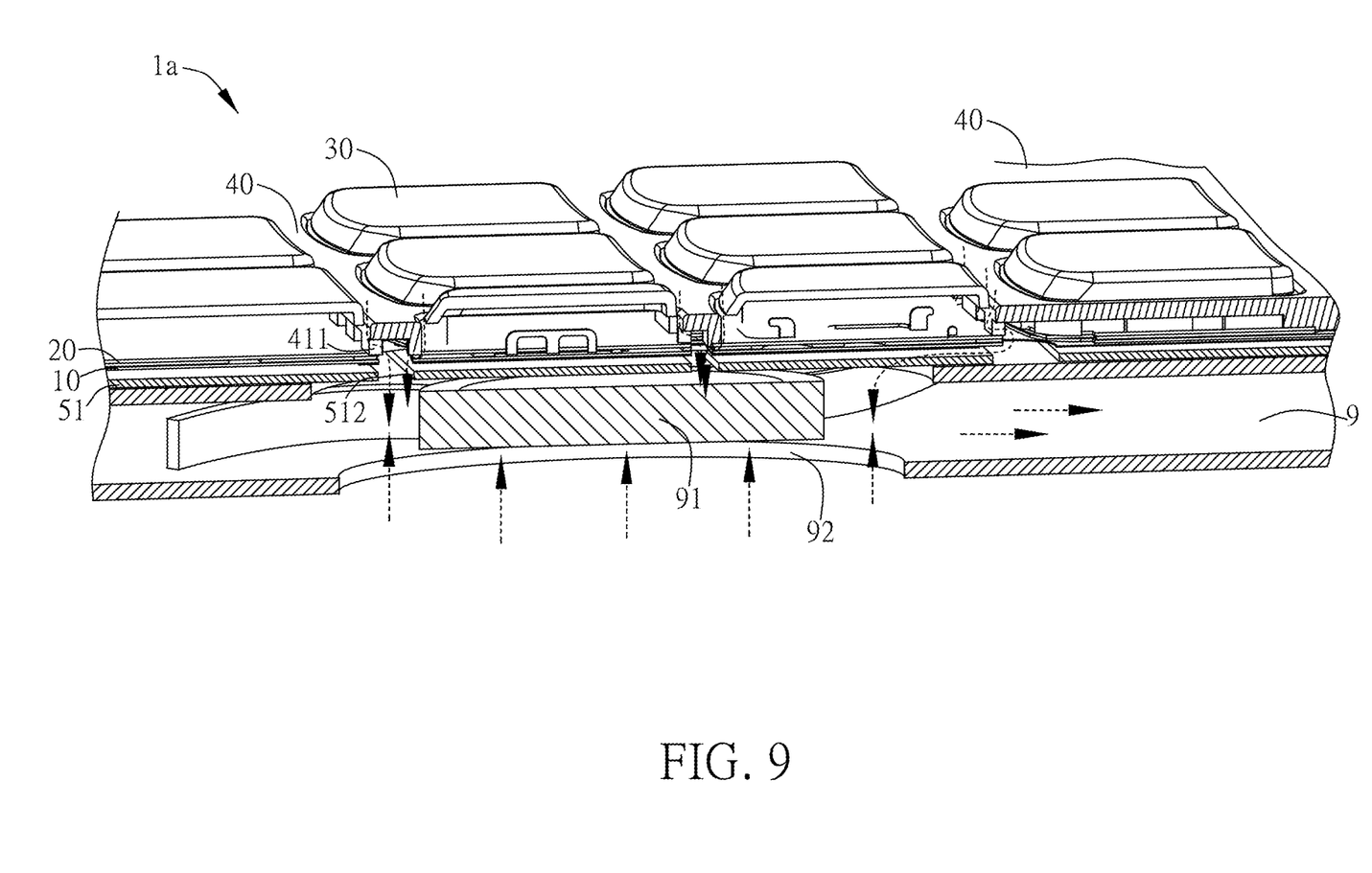
FIG. 9 is a partial cross-sectional view of the keyboard shown in FIG. 8 and applied to the portable electronic device.
Figure 10:
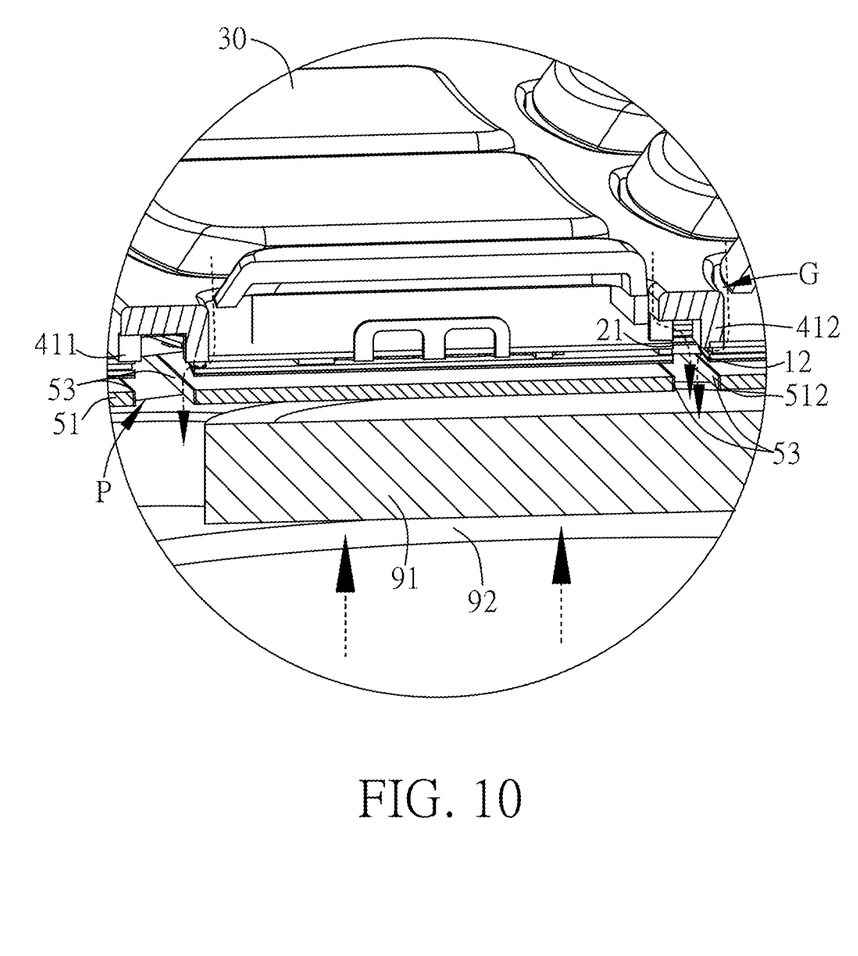
FIG. 10 is an enlarged view of part of the keyboard shown in FIG. 9.

FIG. 8 is an exploded view of the keyboard according to another embodiment of the present disclosure. FIG. 9 is a partial cross-sectional view of the keyboard shown in FIG. 8 and applied to the portable electronic device 9. FIG. 10 is an enlarged view of part of the keyboard shown in FIG. 9. Referring to FIG. 8, FIG. 9 and FIG. 10, in this embodiment, the keyboard 1a further comprises a backlight module 50. Since the other components of the keyboard 1a and their connection relationships are the same as those of the keyboard 1 in the preceding embodiment, their reference numerals remain unchanged. In this embodiment, the backlight module 50 is disposed on one side of the base plate 10 and is opposite to the keys 30. The backlight module 50 comprises a light guide plate 51 and at least one light-emitting unit 52. The light guide plate 51 comprises at least one light-source receiving groove 511 and at least one third opening 512. The third opening 512 corresponds in position to the first opening 12 and the second opening 21.

Similarly, the third opening 512 is structurally identical to the first opening 12 and the second opening 21 and corresponds in position thereto such that the first opening 12, the second opening 21 and the third opening 512 jointly form the through hole P, as shown in FIG. 10. The gaps G between the frame 40 and the keys 30, the first opening 12, the second opening 21, and the third opening 512 of the light guide plate 51 jointly form an air current channel. When the cooling fan 91 is operating, external cold air flows through the portable electronic device 9 via the air current channel to dissipate heat. In a variant embodiment, the backlight module 50 comprises other thin-film structures (for example, light-blocking films or reflective films) with openings, such that the openings, first opening 12, second opening 21 and third opening 512 correspond in position to each other to jointly form an air current channel. Preferably, the rim of the second opening 21 or the first opening 12 is slightly smaller than the rim of the third opening 512; consequently, when light leaks out of the light guide plate 51 via the third opening 512, both the base plate 10 and the membrane circuit board 20 hide the third opening 512 to protect users against interference from the light leaking via the third opening 512. Preferably, the rim of the first opening 12 is slightly smaller than the rim of the third opening 512, whereas the rim of the second opening 21 is slightly smaller than the rim of the first opening 12; consequently, the base plate 10 blocks the light leaking via the third opening 512, and the membrane circuit board 20 blocks the light leaking via the first opening 12. Referring to FIG. 10, preferably, in this embodiment, the backlight module 50 has a reflective structure 53 disposed on the inner wall of the third opening 512 of the light guide plate 51. In this embodiment, the reflective structure 53 is a reflective film affixed to the bottom side of the light guide plate 51 and adapted to enclose the third opening 512. When light from the light guide plate 51 reaches the third opening 512, the light reflects off the reflective structure 53 and returns to the light guide plate 51 for reuse, thereby precluding light leakage. The reflective structure 53 is shown in FIG. 10 rather than FIG. 9 to render the diagrams simple. Preferably, when the rim of the first opening 12 is slightly smaller than the rim of the third opening 512, the terminal end of the reflective structure 53 is affixed to the bottom side (in the vicinity of the first opening 12) of the base plate 10 to optimize the prevention of light leakage.

Referring to FIG. 8, the light-emitting unit 52 is received in the light-source receiving groove 511 of the light guide plate 51 such that the light-emitting unit 52 emits light toward the interior of the light guide plate 51. The light-emitting unit 52 has a light emission direction (indicated by arrows with dashed-line tails in FIG. 8). In this embodiment, the light emission direction is parallel to the long-axis direction X of the light guide plate 51 (or the keyboard 1a). Preferably, the long-axis direction X of the third opening 512 is parallel to the light emission direction to prevent an opening (the third opening 512) from affecting the efficiency of light utilization of the light guide plate 51. The long-axis direction X of the third opening 512 is parallel to the light emission direction, and thus the short side of the third opening 512 faces the light emission direction. Therefore, light emitted from the light-emitting unit 52 falls on the least possible area of the third opening 512 to have the least effect on the efficiency of light utilization of the light guide plate 51. Conversely, if the long-axis direction X of the third opening 512 is perpendicular to the light emission direction, the long side of the third opening 512 faces the light emission direction; consequently, light emitted from the light-emitting unit 52 falls on a large area of the third opening 512 to affect propagation of light within the light guide plate 51.

In conclusion, a keyboard of the present disclosure comprises a base plate and a membrane circuit board. The base plate has assembly areas and at least one first opening disposed between some said assembly areas. The membrane circuit board has at least one second opening corresponding in position to the at least one first opening, respectively. Owing to the first opening and the second opening, external cold air enters an applicable device (for example, a portable electronic device) via the gaps between the frame and the keys, the first opening and the second opening to achieve heat dissipation.

The embodiments are illustrative of the present disclosure and thus serve exemplary purposes only. Accordingly, the legal protection for the present disclosure shall be defined by the appended claims rather than restricted to the embodiments.

What is claimed is:

1. A keyboard, comprising:
    a base plate, comprising:
        a plurality of assembly areas; and
        at least one first opening disposed between some said assembly areas;
    a membrane circuit board disposed above the base plate and comprising at least one second opening corresponding in position to the first opening;
    a frame disposed above the base plate and adapted to block the first opening and the second opening, wherein the frame comprises a plurality of receiving portions corresponding in position to the assembly areas, wherein the membrane circuit board is disposed between the base plate and the frame; and
    a plurality of keys passing through the receiving portions and fixed to the assembly areas of the base plate, respectively, wherein gaps between the frame and the keys, the first opening and the second opening jointly form an air current channel.

2. The keyboard of claim 1, wherein the first opening and the second opening jointly form a through hole.

3. The keyboard of claim 1, wherein a width of the first opening is substantially greater than a width of one of the assembly areas.

4. The keyboard of claim 1, wherein the first opening further comprises an extension portion extending outward along a short-axis direction of the base plate and being disposed between two adjacent said assembly areas.

5. The keyboard of claim 1, wherein each said receiving portion has at least one recessed portion disposed on one of sidewalls of the receiving portion.

6. The keyboard of claim 5, wherein the receiving portion has a plurality of recessed portions disposed on at least one said sidewall of the receiving portion and spaced apart.

7. The keyboard of claim 6, wherein the recessed portions are disposed on two opposing said sidewalls of the receiving portion, spaced apart, and arranged in staggered.

8. The keyboard of claim 1, further comprising:
    a backlight module disposed on a side of the base plate and opposing the keys, the backlight module comprising:
        a light guide plate comprising at least one third opening corresponding in position to the first opening and the second opening; and
        at least one light-emitting unit emitting light toward an interior of the light guide plate.

9. The keyboard of claim 8, wherein the light-emitting unit has a light emission direction parallel to a long-axis direction of the third opening.

10. The keyboard of claim 8, wherein the backlight module has a reflective structure disposed on an inner wall of the third opening of the light guide plate.

11. The keyboard of claim 8, wherein a rim of the first opening or the second opening is smaller than a rim of the third opening.

12. The keyboard of claim 8, wherein a rim of the second opening is smaller than a rim of the first opening, and a rim of the first opening is smaller than a rim of the third opening.

13. The keyboard of claim 1, wherein a rim of the second opening is smaller than a rim of the first opening.

14. The keyboard of claim 1, wherein a long-axis direction of the first opening is parallel to a long-axis direction of the base plate.

\* \* \* \* \*